United States Patent [19]

Gronvall et al.

[11] 4,067,191

[45] Jan. 10, 1978

[54] SYSTEM FOR SUPPLYING FUEL AND COMBUSTION AIR TO AN EXTERNAL COMBUSTION ENGINE

[75] Inventors: Karl Olof Ragnar Grönvall; Per Henrik Gosta Nyström, both of Borensberg, Sweden

[73] Assignee: Forenade Fabriksverken, Eskilstuna, Sweden

[21] Appl. No.: 621,524

[22] Filed: Oct. 10, 1975

[51] Int. Cl.² .............................. F02C 9/08; F02C 9/14

[52] U.S. Cl. .............................. 60/39.27; 60/39.28 R; 60/39.28 T; 60/39.29

[58] Field of Search ................ 60/39.27, 39.29, 39.23, 60/39.6, 39.63

[56] References Cited

U.S. PATENT DOCUMENTS

| | | | |
|---|---|---|---|
| 2,392,622 | 1/1946 | Traupel | 60/39.27 X |
| 2,606,420 | 8/1952 | Moore | 60/39.27 X |
| 2,886,968 | 5/1959 | Johnson | 60/39.29 UX |
| 3,006,145 | 10/1961 | Sobey | 60/39.27 X |
| 3,172,259 | 3/1965 | North | 60/39.29 X |
| 3,173,254 | 3/1965 | Malan | 60/39.6 |
| 3,439,497 | 4/1969 | Cross | 60/39.29 |
| 3,584,459 | 6/1971 | Amann | 60/39.27 X |
| 3,780,528 | 12/1973 | Brandenburg | 60/39.27 |
| 3,798,901 | 3/1974 | Lewenhaupt | 60/39.27 |

FOREIGN PATENT DOCUMENTS

| | | | |
|---|---|---|---|
| 465,659 | 6/1950 | Canada | 110/101 CF |
| 1,182,604 | 6/1959 | France | 60/39.29 |
| 858,477 | 12/1952 | Germany | 60/39.27 |
| 656,888 | 9/1951 | United Kingdom | 60/39.27 |

*Primary Examiner*—Clarence R. Gordon
*Attorney, Agent, or Firm*—Laurence R. Brown

[57] ABSTRACT

Provision is made to measure the heat of heater tubes in an external combustion engine and to control thereby as a function of changes of temperature the flow of air to the fuel burner. As the air supply increases the fuel supply is regulated. Thus as the load increases and the heater tubes cool more air and fuel is supplied to increase the heating to a desired level.

3 Claims, 3 Drawing Figures

SYSTEM FOR SUPPLYING FUEL AND COMBUSTION AIR TO AN EXTERNAL COMBUSTION ENGINE

This invention relates to a system for supplying fuel and combustion air to an external combustion engine and of the type comprising means for measuring the temperature of a high temperature part of said engine and governing means for adjusting the mass flow of combustion air fed to a combustion chamber of the engine in proportion to the difference between the measured and the desired temperature of said high temperature engine part.

In known systems of this type the fuel supply may be governed by electronic means or by mechanical systems directly influenced by the air flow. In both cases the systems will be rather complicated and expensive.

One object of the present invention is to provide an improved system which is inexpensive and reliable and which is easy to maintain.

According to the invention this is obtained by measuring the mass flow of air supplied to said combustion chamber and supplying fuel in proportion to the prevailing mass flow.

Figure 1:
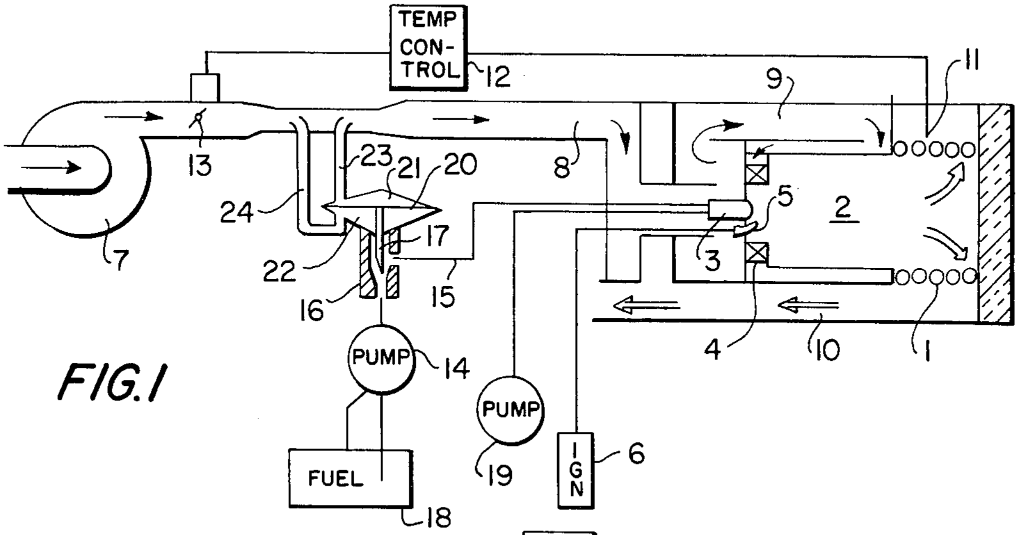
Figure 2:
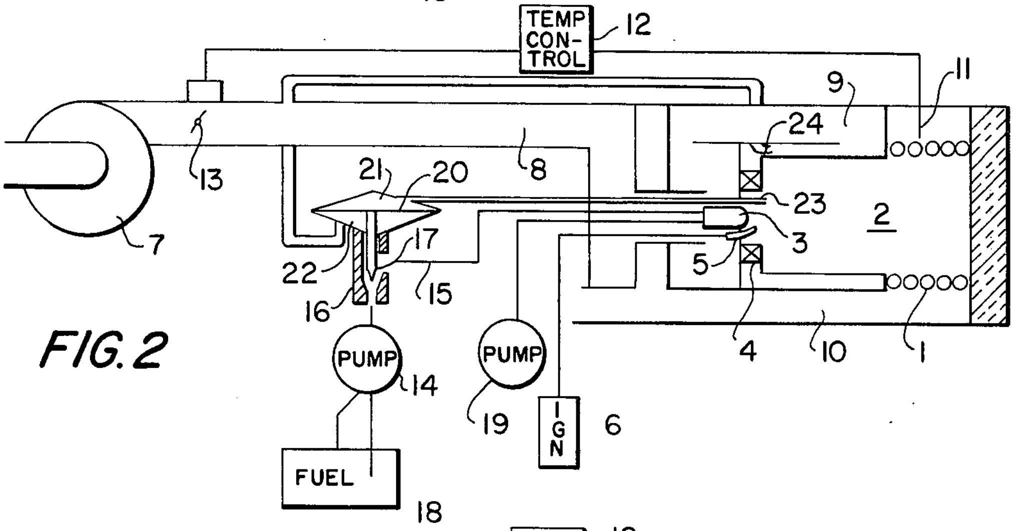
Figure 3:
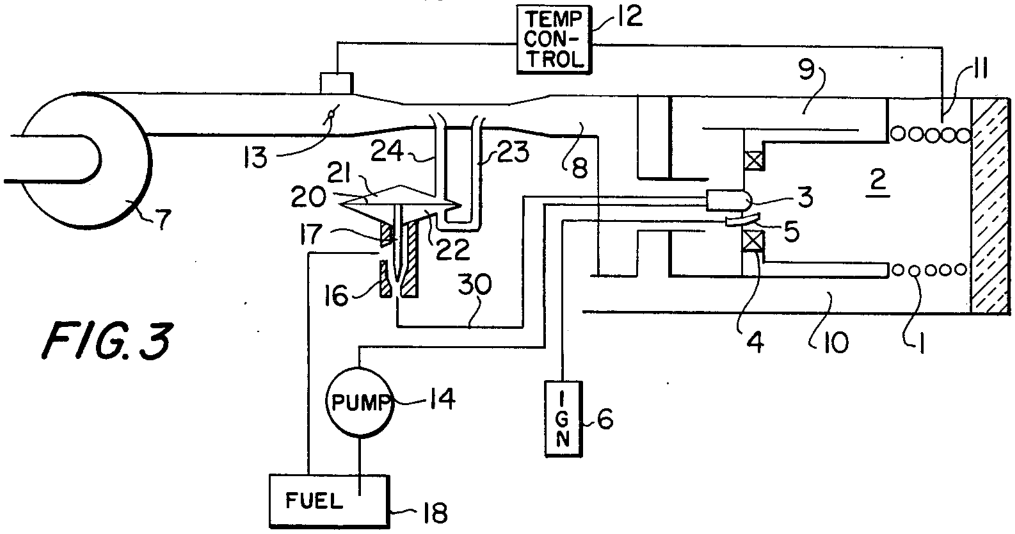

The invention will be described in more detail reference being made to the drawing in which FIGS. 1–3 schematically show three different embodiments of systems according to the invention.

The system shown in FIG. 1 comprises a number of heater tubes 1 forming a high temperature part of an external combustion engine. Said tubes 1 are located adjacent to a combustion chamber 2 in which fuel is burnt with air. The fuel is supplied from a nozzle 3 and the air is supplied from a turbulator 4 to said combustion chamber 2. The fuel is ignited by sparks of a spark plug 5 connected to an ignition coil 6.

The combustion gases formed in the combustion chamber 2 will pass between the tubes 1 and give off heat to said tubes. The residual heat contained in the combustion gases is used to a large extent by heat exchange with the combustion air delivered to the turbulator 4. The combustion gases will follow a path shown by double line arrows.

The air for combustion is delivered by a blower 7 and is passed through a duct 8 leading to a preheater comprising a number of angularly spaced axially extending channels 9 separated by angularly spaced axially extended channels 10 forming passages for the combustion gases. The air for the combustion follows a path shown by single line arrows.

The temperature of the tubes 1 is measured by a thermoelement 11 giving signals to an electronic device 12 in which the difference between the actual temperature and a desired temperature is amplified and used for regulating a flap valve 13 in the duct 8. If the temperature of the tubes 1 is lower than desired the valve 13 will open to increase the air flow and if the temperature is too high the valve 13 will cause a decrease of flow of air to the combustion chamber.

Fuel is pumped by a pump 14 to the nozzle 3 via a conduit 15 including a valve 16. The flow through the valve 16 is governed by a needle 17. The pump 14 is of a type giving off fuel at a constant pressure. Surplus of fuel is returned to a reservoir 18. The fuel supplied to the nozzle 3 is atomized by compressed air delivered from a separate pump 19.

The needle 17 of the valve 16 is connected to a flexible membrane 20 separating two chambers 21 and 22. Chambers 21 and 22 are connected respectively to conduits 23 and 24. The two conduits 23, 24 form a pressure drop measuring device arranged in the conduit 8 for measuring the mass flow of air therein.

The principal operation of the device described is as follows:

In case the engine load is increased the hot part of the engine — i.e. the tubes 1 will be cooled off. In order to maintain the power output and the efficiency of the engine (which may be a steam engine or a stirling cycle engine) the temperature of the tubes 1 should be raised to the desired level. This is done by supplying more combustion air. The mass flow of air is continuously measured and the result is directly used for governing the fuel supply.

FIG. 2 shows a system which deviates from the system shown in FIG. 1 only in that the conduits 23, 24 forming the pressure drop measuring device are measuring the mass flow across the turbulator 4. Thus any leakage in the walls separating the preheater channels 9 will not cause faults in the proportion between delivered air and delivered fuel.

FIG. 3 shows a system in which the atomizing air supply is omitted. The fuel pump 14 delivers a constant amount of high pressurized fuel to the nozzle 3 from which a return conduit 30 containing the valve 16 leads to the reservoir 18. The needle 17 governs the flow of fuel to be returned. This system involves that the conduit 24 should be connected to the chamber above the membrane carrying the needle 17 and the conduit 23 to the chamber below the membrane.

Temperature control means such as shown at 12 is well known in the art as described in U.S. Pat. No. 3,782,120, Jan. 1, 1974 or West German Pat. No. 2,427,819, Sept. 1, 1975.

What is claimed is:

1. A system for supplying fuel and combustion air to an external combustion engine with a combustion chamber operable with a predetermined proportion of fuel and air flow thereinto as temperature changes with variable engine loads comprising in combination, means for measuring the temperature of a high temperature part of said engine, governing means for adjusting the mass flow of combustion air fed to said combustion chamber of the engine in proportion to the difference between the measured and the desired temperature of said high temperature engine part, means for measuring the mass flow of air supplied to said combustion chamber comprising a turbulator nozzle supplying air into said combustion chamber and a pressure drop measuring device measuring the mass flow of air through said turbulator nozzle by sampling air flow inside and outside the combustion chamber, and means for supplying fuel in said predetermined proportion to the prevailing mass flow.

2. A system according to claim 1, wherein said pressure drop measuring device is connected to control a diaphragm controlled fuel valve adjusting the fuel supply to the combustion chamber.

3. A system according to claim 2, characterized in that said diaphragm controlled fuel valve is mounted at the delivery side of a fuel pump delivering fuel at a constant pressure.

* * * * *